United States Patent
Vincent

(10) Patent No.: US 9,247,380 B1
(45) Date of Patent: Jan. 26, 2016

(54) LOCATION BASED MOBILE DEVICE PROFILES

(71) Applicant: Google Inc., Mountain View, CA (US)

(72) Inventor: Luc Vincent, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 13 days.

(21) Appl. No.: 14/214,288

(22) Filed: Mar. 14, 2014

Related U.S. Application Data

(60) Provisional application No. 61/798,746, filed on Mar. 15, 2013.

(51) Int. Cl.
*H04W 4/02* (2009.01)

(52) U.S. Cl.
CPC ........................................ *H04W 4/02* (2013.01)

(58) Field of Classification Search
CPC ....... H04W 4/00; H04W 4/001; H04W 4/003; H04W 4/006; H04W 4/02; H04W 4/12; H04W 4/021; H04W 4/025; H04W 4/14; H04W 4/185; H04W 8/18; H04W 24/00; H04W 36/00; H04W 4/18; H04W 4/023; H04L 67/00; H04L 67/34; G06F 9/445; G06F 9/4862; G06F 3/0481; G06F 3/04817; H04M 1/00; H04M 3/00
See application file for complete search history.

(56) References Cited

U.S. PATENT DOCUMENTS

| | | | | |
|---|---|---|---|---|
| 7,221,939 | B2* | 5/2007 | Ylitalo et al. | 455/435.1 |
| 8,000,749 | B1* | 8/2011 | McConnell et al. | 455/566 |
| 2006/0089792 | A1* | 4/2006 | Manber et al. | 701/207 |
| 2008/0184138 | A1* | 7/2008 | Krzanowski et al. | 715/760 |
| 2008/0235680 | A1* | 9/2008 | Strauss et al. | 717/178 |
| 2010/0075648 | A1* | 3/2010 | Matsuoka et al. | 455/418 |
| 2010/0318701 | A1* | 12/2010 | Srinivasan et al. | 710/104 |
| 2012/0100867 | A1 | 4/2012 | Liang et al. | |
| 2012/0284256 | A1* | 11/2012 | Mahajan et al. | 707/722 |
| 2013/0085861 | A1* | 4/2013 | Dunlap | 705/14.58 |
| 2013/0091452 | A1* | 4/2013 | Sorden et al. | 715/771 |
| 2013/0232540 | A1* | 9/2013 | Saidi et al. | 726/1 |
| 2014/0108939 | A1* | 4/2014 | Mahapatra et al. | 715/738 |

FOREIGN PATENT DOCUMENTS

| | | |
|---|---|---|
| EP | 2235990 | 10/2010 |
| EP | 2320686 A1 | 5/2011 |
| WO | 2013025382 A1 | 2/2013 |

* cited by examiner

*Primary Examiner* — Meless Zewdu
(74) *Attorney, Agent, or Firm* — Dority & Manning, P.A.

(57) ABSTRACT

A computer-implemented method and system for configuring a mobile device is provided. The method includes detecting location information for a location of a mobile device, determining if the detected location information is associated with a location based profile, wherein the location based profile defines a set of one or more applications for display on a homepage of the mobile device based on the location of the mobile device, selecting the location based profile associated with the detected location information when the detected location information is associated with a location based profile and configuring the mobile device based on the selected location based profile, such that activation icons of the set of one or more applications are provided for display on the homepage of the mobile device.

20 Claims, 6 Drawing Sheets

LOCATION BASED MOBILE DEVICE PROFILES

CROSS-REFERENCE TO RELATED APPLICATION

The present application claims the benefit of U.S. Provisional Patent Application Ser. No. 61/798,746, entitled "Location Based Mobile Device Profiles," filed on Mar. 15, 2013, which is hereby incorporated by reference in its entirety for all purposes.

BACKGROUND

The present disclosure generally relates to mobile device configuration profiles and, in particular, to configuring a mobile device using profiles based on the location of the mobile device.

The applications that a user most frequently accesses on a smart phone or other mobile device can change depending on where the user is located. For example, a user may tend to more frequently access one set of applications at work, another set of applications at home, and yet another set of applications when traveling. The user may access calendar, email, and research applications more frequently at work. The user may access television control, music, and entertainment applications more frequently at home. When traveling, the user may access airline and traffic update applications more frequently. A user may tend to access other applications more frequently when they are in other locations.

SUMMARY

According to one aspect of the present disclosure, a computer-implemented method of configuring a mobile device is provided. The method includes detecting location information for a location of a mobile device. The method can also include determining if the detected location information is associated with a location based profile, wherein the location based profile defines a set of one or more applications for display on a homepage of the mobile device based on the location of the mobile device. The method can also include selecting the location based profile associated with the detected location information when the detected location information is associated with a location based profile. The method can also include configuring the mobile device based on the selected location based profile, such that activation icons of the set of one or more applications are provided for display on the homepage of the mobile device.

According to an additional aspect of the present disclosure, a system for configuring a mobile device is provided. The system includes one or more processors and a machine-readable medium including instructions stored therein. When executed by the one or more processors, the instructions cause the processors to perform operations including detecting location information for a location of a mobile device. The operations can also include identifying a location based profile associated with the detected location information when the detected location information is associated with a location based profile, wherein the location based profile defines a set of one or more applications for display on a homepage of the mobile device based on the location of the mobile device. The operations can also include providing activation icons of the set of one or more applications for display on the homepage of the mobile device.

According to a further aspect of the present disclosure, a machine-readable medium is provided. The medium includes instructions stored therein, which when executed by a machine, cause the machine to perform operations for configuring a mobile device. The operations include detecting location information for a location of a mobile device. The operations can also include determining if the detected location information is associated with a location based profile, wherein the location based profile defines a set of one or more applications for display on a homepage of the mobile device based on the location of the mobile device. The operations can also include selecting the location based profile associated with the detected location information when the detected location information is associated with a location based profile. The operations can also include configuring the mobile device based on the selected location based profile, such that activation icons of the set of one or more applications are provided for display on the homepage of the mobile device. The operations can also include determining if a criteria is met for generating a new location based profile when the detected location information is not associated with a location based profile. The operations can also include generating the new location base profile when the criteria is met.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, that the subject technology may be practiced without some of these specific details. In other instances, well-known structures and techniques have not been shown in detail so as not to obscure the disclosure.

The applications that a user most frequently accesses on a smart phone or other mobile device can change depending on where the user is located. For example, a user may tend to more frequently access one set of applications at work, another set of applications at home, and yet another set of applications when traveling. The user may access calendar, email, and research applications more frequently at work. The user may access television control, music, and entertainment applications more frequently at home. When traveling, the user may access airline and traffic update applications more frequently. A user may tend to access other applications more frequently when they are in other locations.

Many users access too many applications on a regular basis to have all of their applications easily available on their mobile devices' home screens. Therefore, those users may be inconvenienced by navigating away from their home screen to access different applications when they are in different locations. Some aspects of the subject technology address these issues by configuring a mobile device based on a location based profile associated with detected location information. Additional aspects of the subject technology address creation of location based profiles.

In some aspects, a mobile device detects location information about the location of the mobile device. For example, the location information can be detected using a GPS receiver, detected from wireless base stations (e.g., cell towers), or detected using a WiFi receiver in the form of a service set identifier (SSID) for an access point at the location. The location information can be processed by the mobile device, or the location information can be transmitted from the mobile device to a mobile phone server, web server, or other remote computing device, which then receives and processes the location information. The mobile device is configured based on the detected location information according to some aspects of the disclosure, for example by configuring activation icons on a home screen of the mobile device.

Figure 1:
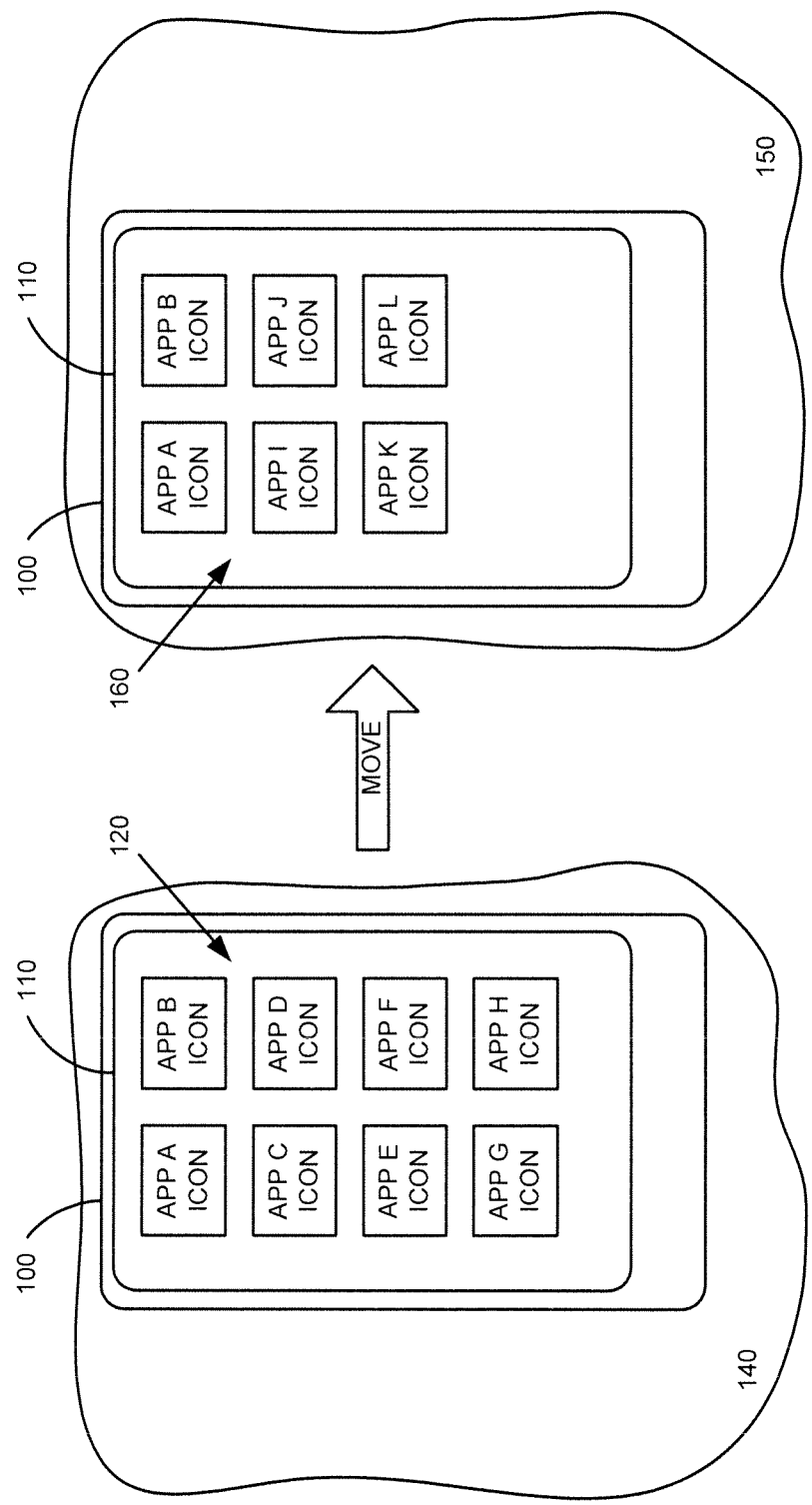
FIG. 1 illustrates an example of changing application icons on a mobile device's home screen when the mobile device changes locations according to some aspects of the disclosure.

FIG. 1 illustrates an example of configuring a mobile device based on detected location information when the mobile device changes locations according to some aspects of the disclosure. In the example shown in FIG. 1, configuring the mobile device includes changing application icons on the mobile device's home screen. Mobile device 100 in the form of a mobile phone is shown displaying home screen 110 with a set of application icons 120 for respective application programs. When the mobile device is moved from a first location 140 to a second location 150, a new set of application icons 160 is displayed on home screen 110. The new set of icons 160 is displayed based on a location based profile associated with location information detected at location 150 according to aspects of the disclosure.

The new set of application icons 160 may be different from the set of application icons 120 (e.g., at least one application is different from application icons 160 as compared to application icons 120). For example, while the sets of application icons may be different, both sets of application icons 120 and 160 may include "APP A ICON" and "APP B ICON." However, there is no requirement that the sets share any application icons. Likewise, there is no requirement that the sets of application icons be different. For example, location based profiles associated with both locations 140 and 150 could designate completely different sets of application icons or a same set of application icons for both locations.

Figure 2:
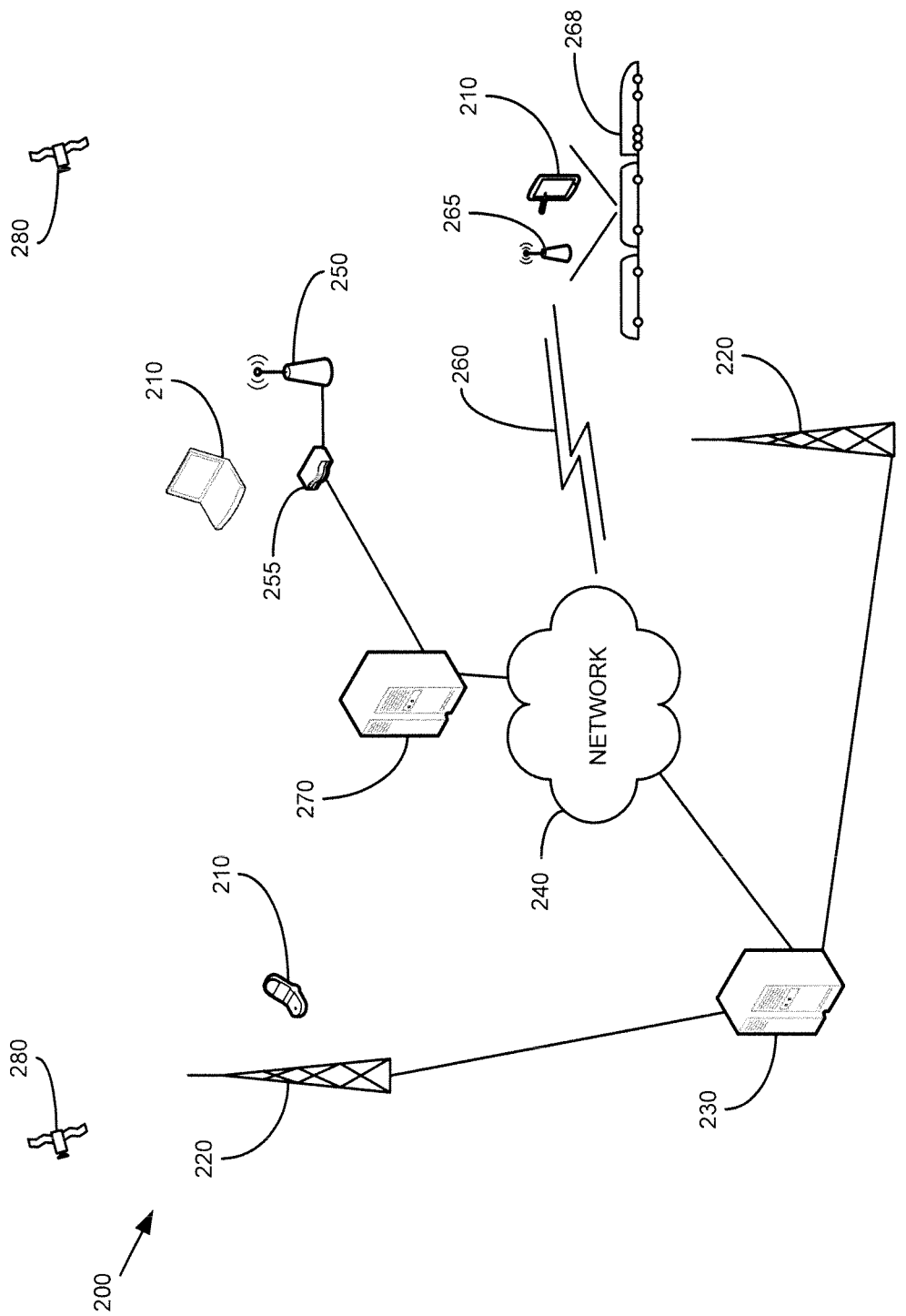
FIG. 2 illustrates an example of an environment in which some aspects of the subject technology can operate.

FIG. 2 illustrates an example of an environment in which some aspects of the subject technology can operate. Environment 200 includes different types of mobile computing devices 210, for example a cell phone, a smart phone, and a laptop computer. Aspects of the disclosure are also applicable to mobile devices such as personal data assistants (PDAs) and tablet computers. The subject technology is not limited to these examples. For example, aspects of the disclosure are also applicable to desktop computers that can be moved between certain locations, for example to a maintenance facility where a location based profile may provide for easier access to icons for maintenance applications. Thus, the term "mobile device" should be broadly construed to include any computing device that can be moved.

The devices in environment 200 communicate with other devices using various communication channels. Three types of communication channels are illustrated in FIG. 2. One communication channel for mobile devices 210 is a mobile phone communication network. This channel includes base stations 220 (e.g., cell towers) that communicate with mobile phone server 230. The mobile phone server in turn communicates with network 240 such as the Internet or an intranet to reach other networks and devices. Another communication channel for mobile devices 210 includes wireless networks. This channel includes wireless access point 250 that communicate through router 260 with server 270. The server in turn communicates with network 240. Another communication channel is wireless connection 260 to wireless access point 265 on moving platform 268, illustrated in FIG. 2 as a train. Each of the mobile devices can communicate with other devices and networks in environment 200.

In some aspects, environment 200 can include more or different communication channels. Likewise, some communication channels may not enable communications with some of the other devices or networks. The subject technology is not limited to the communication channels shown in FIG. 2. Rather, aspects of the subject technology can apply to any communication environment or channel that permits mobile devices to communicate with other devices.

As a mobile device 210 moves about environment 200, the parts of the environment used by the mobile device to communicate can change. For example, the mobile device might be "handed off" from one base station controller to another or from one communication channel to another. Information such as session identifiers or other identifiers defined by various wireless communication protocols is used by mobile devices to identify wireless access points, base stations, and other elements involved in communications. Thus, as the mobile device is moved about environment 200, some of this information can change. The parts of the information that change can be associated with particular locations according to aspects of the disclosure.

A location can be characterized by signals from Global Positioning System (GPS) satellites. Two GPS satellites 280 are illustrated in FIG. 2, although many more GPS satellites are currently in orbit. Coordinates determined based on signals from one or more GPS satellites can be used as location information for a location of a mobile device. Alternatively, the GPS coordinates can be sent to servers or other devices using various communication channels to look up a geographic location of the mobile device, and the geographic information can be used as location information for a location of the mobile device. Triangulation based on signals from base stations also can be used to determine a geographic location for a mobile device.

A particular location can be characterized by other information communicated to a mobile device as well. The term "location information" is used herein for different identifiers, GPS signals, geographic location data derived from GPS signals, geographic location data derived from triangulation, or any other data that characterizes a location, either as a specific physical location or as being potentially different from at least some other locations. For example, a service set identifier (SSID) for a wireless access point may not be associated with a specific physical location, but may distinguish a location as being different from other locations. Alternatively, an SSID can be indexed with physical locations, for example on a web server, so that the SSID is associated with a specific physical location. For another example, a particular location can be designated in some manner other than geographically, for example as work, as home, as a particular train or other vehicle, and the like.

Figure 3:
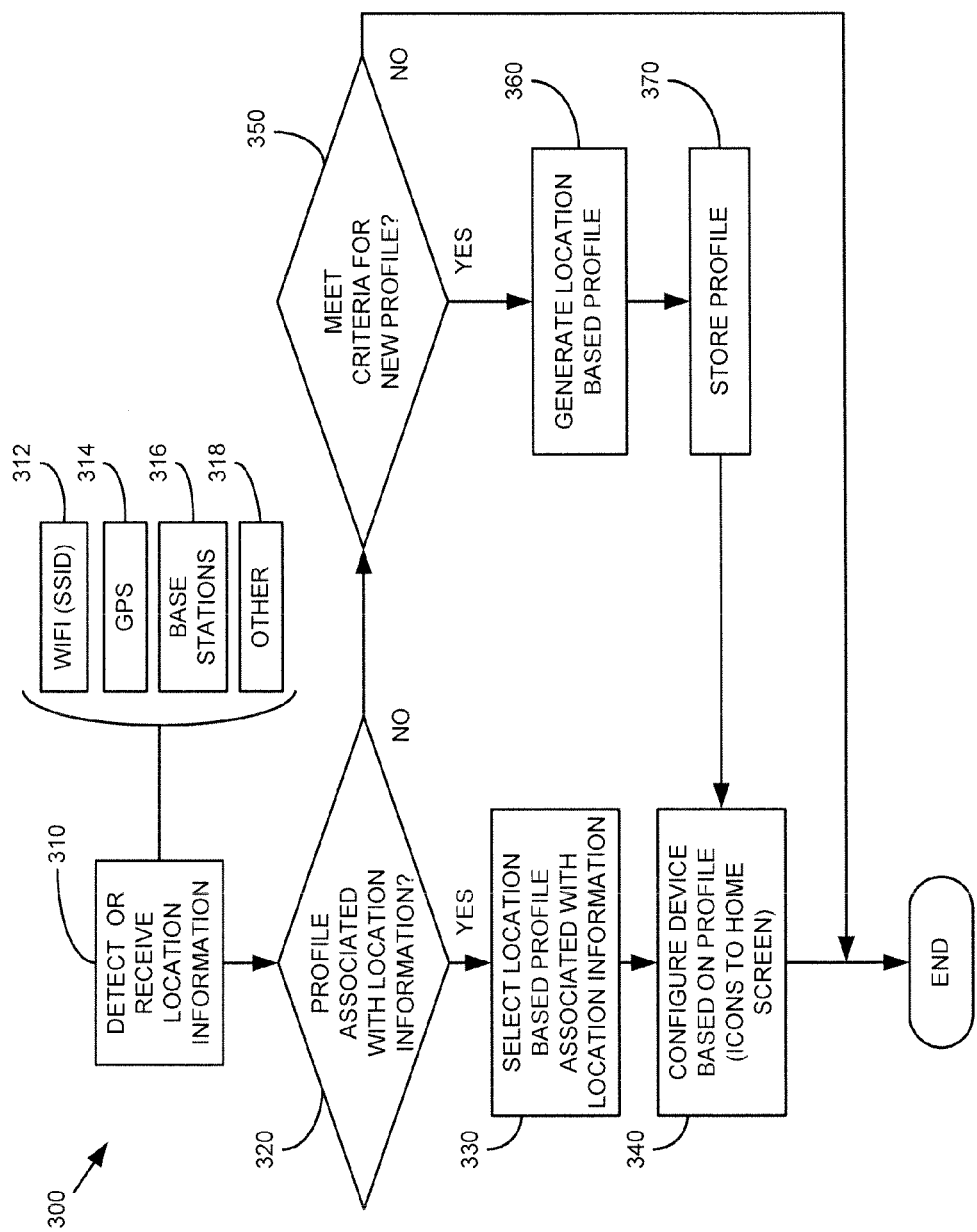
FIG. 3 is a flowchart of an example process for configuring a mobile device using a location based profile according to some aspects of the disclosure.

FIG. 3 is a flowchart of example process 300 for configuring a mobile device using a location based profile according to some aspects of the disclosure. According to aspects of the disclosure, the illustrated process is initiated based on periodic system calls in a computing device, triggered by some internal or external event or signal, triggered by a user, or initiated in some other fashion. Process 300 can be performed locally by a mobile device or remotely by another computing device in communication with the mobile device.

In step 310, location information for a mobile device is detected. The location information is for a location of a mobile device according to aspects of the disclosure. In some aspects, the location information is detected and processed by the mobile device. In other aspects, the detected location information is transmitted from the mobile device to a mobile phone server, web server, or other remote computing device, which then receives and processes the location information.

Several different techniques for detecting the location information are illustrated in FIG. 3. The location information can be detected by WiFi receiver 312 in the form of an SSID for an access point at the location. The information also can be detected using a GPS receiver 314 in the form of GPS data. The SSID or GPS data can be used to look-up a physical location of the mobile device, for example an address, or can be directly used as the location information. The location information further can be detected from wireless base stations 316 (e.g., cell towers). For example, many mobile devices can determine an approximate location by triangulating a position based on mobile phone signals received from multiple base stations. The location information also can be detected using other techniques 318, as well as using some combination or sub-combination of the foregoing techniques. For example, if SSID and GPS based location information are both available to a mobile device at a location, a location based profile associated with the location can include both. If the SSID is detected again, that profile can be used to configure the mobile device even if GPS signals are not available. Likewise, if GPS signals are available, the profile can be used to configure the mobile device even if the SSID is not available.

A determination is made in step 320 whether a location based profile for the mobile device is associated with the detected location information. If a location based profile is associated with the location information, in step 330 the location based profile is selected. The mobile device is configured according to the selected location based profile in step 340, for example, by placing activation icons on a home screen of the mobile device for one or more applications associated with the location information by the profile. In some aspects where the detected location information is processed remotely from the mobile device, step 340 includes transmitting configuration information associated with the selected location based profile from a remote computing device to the mobile device.

If no location based profile is associated with the location information, according to the determination in step 320, a determination is made in step 350 as to whether the detected location information meets a criteria for generating a location based profile. The determination may be, for example, based on logs maintained about location information detected or received by the mobile device over time. Some examples of the criteria include but are not limited to detection of particular location information a certain number of times, in accordance with a schedule, and/or for a certain total cumulative amount of time. In one example, if a mobile device detects a particular SSID for more than a predetermined number of hours (e.g., 4, 6, or 8) every weekday for a predetermined number of weeks (e.g., 2, 3, or 4), then the criteria for a new profile may be met. For another example, if a mobile device detects a combination of GPS and SSID signals on weekdays for one week, and then detects that same SSID on weekdays for a predetermined number of additional weeks in a row, then the criteria for a new location based profile may be met. For a further example, the criteria can be detection of particular location information for a certain number of days in a predetermined time span (e.g., 7 days per month), for more than a certain number of hours over a predetermined time span (e.g., more than 20 hours in 4 weeks), and/or in a manner that matches any type of defined pattern. In some aspects, the criteria for generation of a new location based profile can be pre-set (e.g., as defaults), and a user or administrator can modify the criteria.

If the detected location information meets the criteria for a new location based profile, in step 360, a location based profile is generated. The profile associates the detected location information with one or more applications according to aspects of the disclosure. The new location based profile is stored in step 370.

Figure 4:
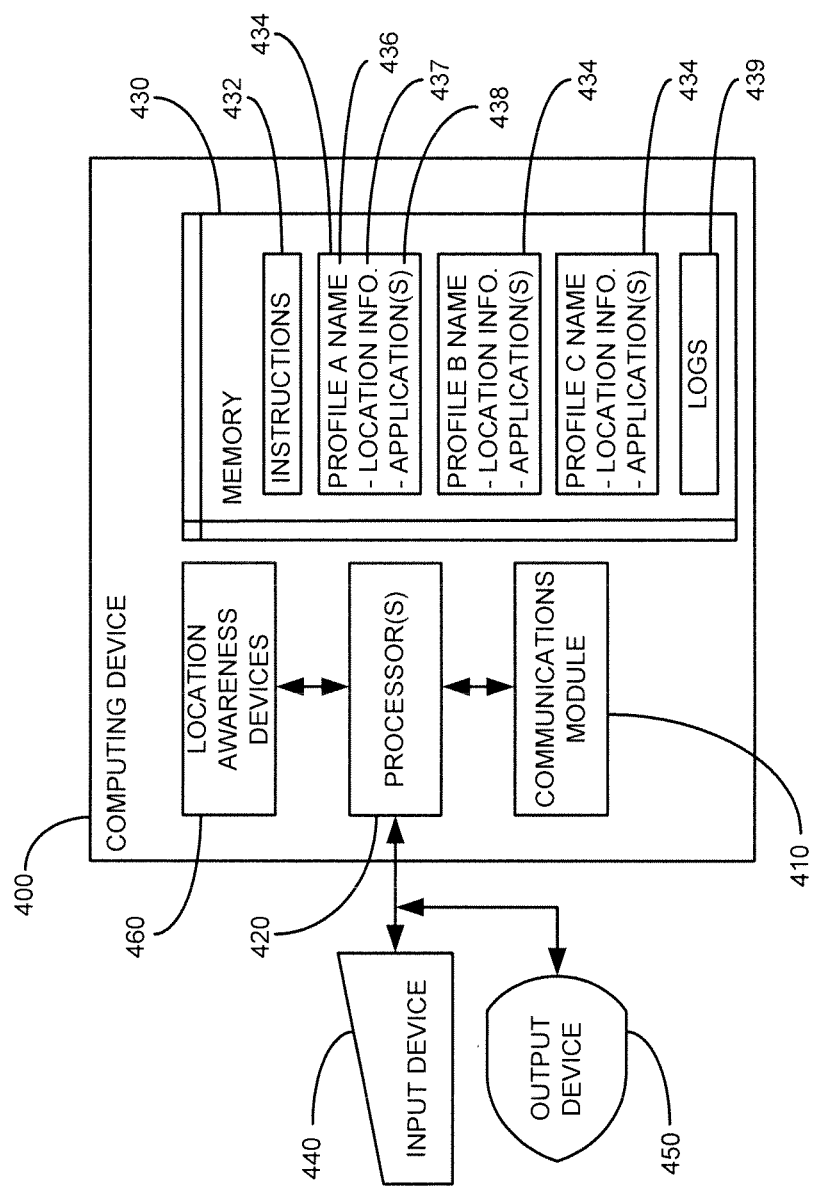
FIG. 4 is a block diagram illustrating an example of a computing device that can be used to perform the method illustrated in FIG. 3 according to certain aspects of the disclosure.

FIG. 4 is a block diagram illustrating an example of a computing device that can be used to perform the method illustrated in FIG. 3 according to certain aspects of the disclosure. Computing device 400 in FIG. 4 can be any of the mobile devices illustrated in FIG. 2, as well as other mobile devices. Computing device 400 communicates with other devices using communication module 410, which is configured to interface with a wired or wireless network to send and receive information. Communication module 410 can be, for example, a wireless transceiver and associated communications control modules, a modem, an Ethernet card, or the like.

A computing device according to aspects of the disclosure includes processing hardware and some form of memory. In FIG. 4, computing device 400 includes processor 420 and memory 430, which can be volatile or non-volatile memory. Memory 430 stores instructions 432 executable by the processing hardware to perform various operations including, for example, communicating with other devices, communicating with users, and configuring mobile devices using location based profiles according to aspects of the disclosure. The instructions can include operations for configuring computing device 400 or for configuring another computing device, for example via communication using communication module 410. The memory also can store instructions for performing other operations. According to some aspects of the disclosure, memory 430 further can store location based profiles 434.

Three location based profiles 434 are shown in memory 430. Aspects of the disclosure are applicable to any number of profiles, including zero profiles (e.g., before creation of a profile). The profiles can be for computing device 400 or for one or more other computing devices, for example for configuring the other computing devices via communication module 410.

Each profile 434 includes name 436, location information 437, and configuration information in the form of application(s) 438. Name 436 is a name that in some aspects can be used to handle a location based profile, for example through a profile management application. Location information 437 is information that characterizes a location according to certain aspects of the disclosure. This information can identify physical coordinates of a location or can be information that characterizes the location as being potentially different from at least some other locations. For example, location information 437 can identify a specific physical location such as GPS coordinates or a geographic location determined based on GPS signals or wireless base station signal. For another example, location information 437 can be a service set identifier (SSID) for a wireless access point (e.g., wireless router) accessible by a mobile device at a location. Location information 437 can be any other type of information that characterizes a location, either uniquely or as being different from another location. Furthermore, location information 437 can include various combinations of different types of location information, for example both SSID information and GPS coordinates.

Application(s) 438 are identifiers, links, handles, or other data that can be used to access icons for application programs or the programs themselves. Each of profiles 434 in FIG. 4 associates location information 437 with application(s) 438 according to aspects of the disclosure. Thus, profiles 434 can be used to configure a mobile device by displaying application icons for application(s) 438 on a home screen of the mobile device.

In some aspects, location based profiles can include configuration information other than or in addition to configuration information in the form of application(s) 438. For example, the location based profiles can include web page settings (e.g., home pages and available links) for a browser on the mobile device, BLUETOOTH® settings, preferred WiFi connection settings, and other configuration information for a mobile device. This configuration information can be used to configure the mobile device when the location information associated with the configuration information in a location based profile is detected by the mobile device.

According to some aspects of the subject technology, memory 430 also stores logs 439 of location information that has been detected by computing device 400 over time and applications that a user has used at the associated locations. These logs can be used to determine whether to create new location based profiles according to aspects of the disclosure, as well in the generation of those new location based profiles.

In some aspects, a user must give permission for a mobile device or other computing device to maintain location based profiles 434 and logs 439. In particular, location based profiles 434 and logs 439 can include a user's information, for example location information about where the user has taken the mobile device and applications used by the user at those locations. This information can be stored locally by the mobile device or remotely by another computing device. In addition, in some aspects this information can be shared, for example between mobile devices or between a mobile device and a mobile phone server or web server. The server can then share this information with other mobile devices that the user may have. According to aspects of the subject technology, a user must give permission for the location based profiles and logs to be generated, stored, maintained, or shared, and the user can otherwise adjust privacy settings to limit whether and how this information is generated and used. For example, the user can designate that the location based profiles or logs are only to be stored on the user's own mobile device(s) (e.g., locally as opposed to remotely a server). In example aspects, the location based profiles and logs do not include the specific identification of the user (e.g., the user's name) unless otherwise specifically provided or directed by the user. The location based profiles and logs also can be encrypted or otherwise protected from unauthorized access.

Computing device 400 also can include input device 440 and output device 450 for accepting input from and providing output to a user. In some aspects, computing device 400 further can include location aware device 460. For example, location aware device 460 can be a GPS receiver for receiving signals from GPS satellites. Location aware device 460 can be another type of device that detects location information.

Some computing devices will not include all of the features or include all of the instruction and data shown in FIG. 4 according to some aspects of the disclosure. Other computing devices will include additional features. Thus, the subject technology is not limited to the computing device illustrated in FIG. 4.

Figure 5:
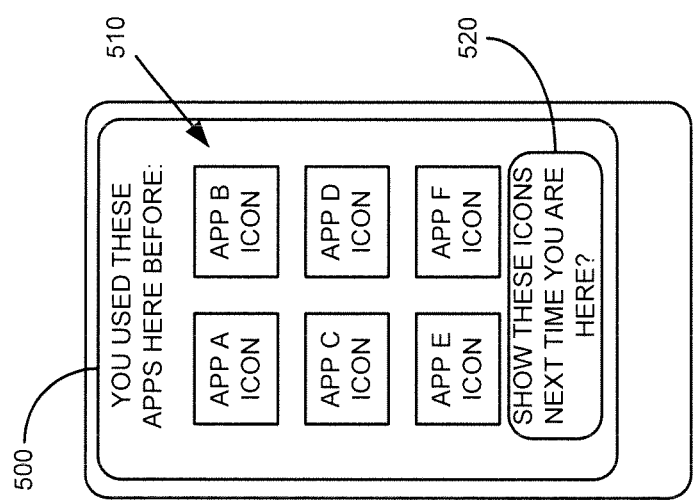
FIG. 5 is an example of an interface for configuring a location based profile according to some aspects of the disclosure.

FIG. 5 is an example of an interface for configuring a location based profile according to some aspects of the disclosure. Interface 500 shows icons 510 for a set of applications that represent applications a user has used before on a mobile device when currently detected location information was previously detected. According to some aspects, logs of detected location information and application usage over time are maintained by a mobile device and can be used to identify the set of applications for which icons 510 are shown. The user can accept the set of applications by using activation button 520, and that set of applications can then be associated with the currently detected location information in a new location based profile. The new location based profile is stored, for example locally or remotely, for later access to configure the mobile device according to aspects of the disclosure.

Figure 6:
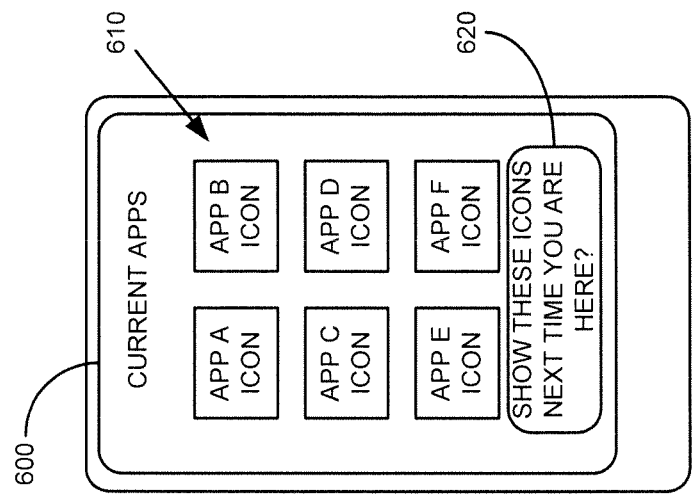
FIG. 6 is another example of an interface for configuring a location based profile according to some aspects of the disclosure.

FIG. 6 is another example of an interface for configuring a location based profile according to some aspects of the disclosure. Interface 600 shows icons 610 for a set of application that represent applications currently running on the mobile device. The user can accept the set of applications by using activation button 620, and the set of applications can then be stored in a new location based profile along with the currently detected location information for later use according to aspects of the disclosure.

Figure 7:
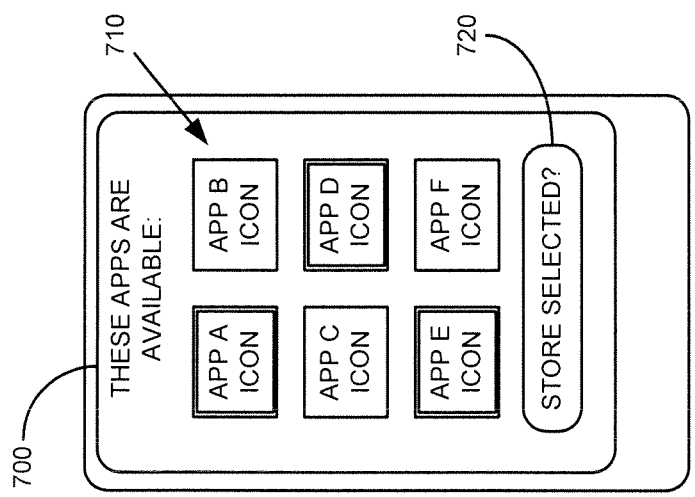
FIG. 7 is a further example of an interface for configuring a location based profile according to some aspects of the disclosure.

FIG. 7 is another example of an interface for configuring a location based profile according to some aspects of the disclosure. Interface 700 shows icons 710 for a set of applications that represent applications a user can select for a location based profile. Icons for "APP A," "APP D," and "APP E" have been selected in FIG. 7. Once the user is satisfied with his or her selections, the user can accept the selected set of applications for association with the currently detected location information in a location based profile by using activation button 720. The set of applications can then be stored in a new location based profile along with the currently detected location information for later use according to aspects of the disclosure.

Figure 8:
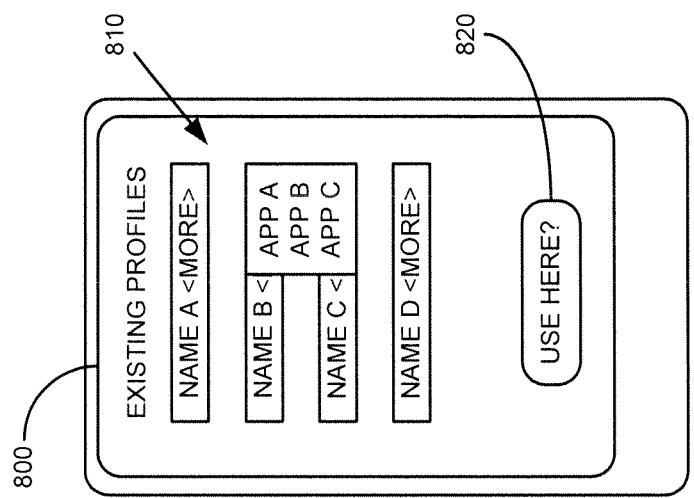
FIG. 8 is an additional example of an interface for configuring a location based profile according to some aspects of the disclosure.

FIG. 8 is a further example of an interface for configuring a location based profile according to some aspects of the disclosure. Interface 800 shows location based profiles 810 that already exist on the mobile device. A user can select one of these profiles and then use activation button 820 to indicate that the selected profile (or a copy of the selected profile)

should be associated with the currently detected location information. Features for adding, editing, deleting, and otherwise managing location based profiles also can be provided by interface 800.

Aspects of the subject technology for creating and configuring location based profiles are not limited to the interfaces shown in FIGS. 5, 6, 7, and 8. Rather, many other techniques can be used to associated detected location information with application programs in location based profiles.

Computing devices according to aspects of the disclosure can be any devices having processing hardware, memory, and communications capability necessary to perform some or all of the operations disclosed herein. Computing devices can be mobile devices, for example mobile phones, personal data assistants (PDAs), laptop computers, and tablet computers. For another example, aspects of the disclosure are also applicable to desktop computers that can be moved between certain locations. In addition, aspects of the disclosure are applicable to non-mobile devices, for example that configure mobile devices remotely using aspects of the subject technology.

The computing devices can communicate using various communication channels according to aspects of the disclosure. These channels can include, for example, any one or more of a mobile phone network, another wireless network, a wired network, a personal area network (PAN), a local area network (LAN), a campus area network (CAN), a metropolitan area network (MAN), a wide area network (WAN), a broadband network (BBN), a peer-to-peer network, an ad-hoc network, the Internet, and the like. Further, the communication networks can include, but are not limited to, any one or more network topologies such as a bus network, a star network, a ring network, a mesh network, a star-bus network, tree or hierarchical network, and the like.

The operations described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged and that some steps may be skipped. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method of configuring a mobile device, comprising:
   detecting, by one or more computing devices, location information for a location of the mobile device;
   determining, by the one or more computing devices, if the detected location information is associated with any a plurality of location based profiles, wherein the plurality of location based profiles respectively define a plurality of sets of one or more applications for display on a homepage of the mobile device based on the location of the mobile device, the plurality of location based profiles respectively associated with a plurality of different locations;
   when it is determined that the detected location information is associated with a first location based profile of the plurality of location based profiles:
      selecting, by the one or more computing devices, the first location based profile associated with the detected location information; and
      configuring, by the one or more computing devices, the mobile device based on the first location based profile, such that activation icons of a first set of one or more applications defined by the first location based profile are provided for display on the homepage of the mobile device;
   when it is determined that the detected location information is not associated with any of the plurality of location based profiles:
      determining, by the one or more computing devices, whether a criteria for generating a new location based profile is satisfied, wherein determining, by the one or more computing devices, whether the criteria for generating the new location based profile is satisfied comprises analyzing, by the one or more computing devices, at least one of a frequency, a number of instances, or an amount of time that the detected location information has been previously detected for the mobile device; and
   when it is determined that the criteria for generating the new location based profile is satisfied:
      generating, by the one or more computing devices, the new location based profile for the detected location information, wherein the new location based profile defines a second set of one or more applications for display on the homepage of the mobile device; and
      configuring, by the one or more computing devices, the mobile device based on the new location based profile, such that activation icons of the second set of one or more application defined by the new location based profile are provided for display on the homepage of the mobile device.

2. The computer-implemented method of claim 1, wherein the detected location information comprises a global positioning satellite coordinate for the location of the mobile device.

3. The computer-implemented method of claim 1, wherein the detected location information comprises a service set identifier for a wireless access point.

4. The computer-implemented method of claim 1, wherein generating the new location based profile comprises:
   identifying, by the one or more computing devices, the second set of one or more applications on the mobile device; and
   generating, by the one or more computing devices, the new location based profile to associate the detected location information with the second set of one or more applications.

5. The computer-implemented method of claim 4, wherein identifying the second set of one or more applications on the mobile device comprises:
   receiving, by the one or more computing devices, a user selection of the second set of one or more applications on the mobile device.

6. The computer-implemented method of claim 4, wherein identifying the second set of one or more applications on the mobile device comprises:
   determining, by the one or more computing devices, the second set of one or more applications according to historical activity with respect to the one or more applications at the mobile device over time in association with the location information.

7. The computer-implemented method of claim 1, wherein the criteria comprises detection of a particular location information a certain number of times.

8. The computer-implemented method of claim 1, wherein the criteria comprises detection of a particular location information in accordance with a schedule.

9. The computer-implemented method of claim 1, wherein the criteria comprises detection of a particular location information a certain total cumulative amount of time.

10. The computer-implemented method of claim 1, wherein the criteria comprises detection of a particular location information a certain cumulative time period in a predetermined time span.

11. The computer-implemented method of claim 1, wherein the criteria comprises detection of a particular location information in a manner that matches a pre-defined pattern.

12. A system for configuring a mobile device, the system comprising:
a memory comprising instructions stored therein to be used by the system; and
one or more processors that implement the instructions to perform operations comprising:
detecting location information for a location of the mobile device;
determining whether the detected location information is associated with any of a plurality of location based profiles, wherein the plurality of location based profiles respectively define a plurality of sets of one or more applications for display on a homepage of the mobile device based on the location of the mobile device, the plurality of location based profiles respectively associated with a plurality of different locations;
when the detected location information is associated with a first location based profile of the plurality of location based profiles:
identifying the first location based profile associated with the detected location information, wherein the first location based profile defines a first set of one or more applications for display on the homepage of the mobile device; and
providing activation icons of the first set of one or more applications for display on the homepage of the mobile device; and
when the detected location information is not associated with any of the plurality of location based profiles:
determining whether a criteria for generating a new location based profile is satisfied, wherein determining whether the criteria for generating the new location based profile is satisfied comprises analyzing at least one of a frequency, a number of instances, or an amount of time that the detected location information has been previously detected for the mobile device; and
when it is determined that the criteria for generating the new location based profile is satisfied:
generating the new location based profile for the detected location information, wherein the new location based profile defines a second set of one or more applications for display on the homepage of the mobile device; and
configuring the mobile device based on the new location based profile, such that activation icons of the second set of one or more application defined by the new location based profile are provided for display on the homepage of the mobile device.

13. The system of claim 12, wherein generating the new location based profile comprises:
identifying the second set of one or more applications on the mobile device; and
generating the new location based profile to associate the detected location information with the second set of one or more applications.

14. The system of claim 13, wherein identifying the second set of one or more applications on the mobile device comprises:
receiving a user selection of the second set of one or more applications on the mobile device.

15. The system of claim 13, wherein identifying the second set of one or more applications on the mobile device comprises:
determining the second set of one or more applications according to historical activity with respect to the one or more applications at the mobile device over time in association with the location information.

16. The system of claim 12, wherein the criteria comprises detection of the particular location information a certain number of times.

17. The system of claim 12, wherein the criteria comprises detection of the particular location information in accordance with a schedule.

18. The system of claim 12, wherein the criteria comprises detection of the particular location information a certain total cumulative amount of time.

19. The system of claim 12, wherein the criteria comprises detection of the particular location information a certain cumulative time period in a predetermined time span.

20. A non-transitory machine-readable medium comprising instructions stored therein, which when executed by a machine, cause the machine to perform operations for configuring a mobile device, the operations comprising:
detecting location information for a location of the mobile device;
determining if the detected location information is associated with any of a plurality of location based profiles, wherein the plurality of location based profiles respectively define a plurality of sets of one or more applications for display on a homepage of the mobile device based on the location of the mobile device, the plurality of location based profiles respectively associated with a plurality of different locations;
when it is determined that the detected location information is associated with a first location based profile of the plurality of location based profiles:
selecting the first location based profile associated with the detected location information; and
configuring the mobile device based on the first location based profile, such that activation icons of a first set of one or more applications defined by the first location based profile are provided for display on the homepage of the mobile device; and
when it is determined that the detected location information is not associated with a location based profile:
determining if a criteria is met for generating a new location based profile, wherein determining whether the criteria for generating the new location based profile is met comprises analyzing at least one of a frequency, a number of instances, or an amount of time that the detected location information has been previously detected for the mobile device; and
when it is determined that the criteria for generating the new location based profile is met:
generating the new location base profile for the detected location information, wherein the new location based profile defines a second set of one or more applications for display on the homepage of the mobile device; and configuring the mobile device based on the new location based profile, such that activation icons of the second set of one or more application defined by the new location based profile are provided for display on the homepage of the mobile device.

\* \* \* \* \*